US012803668B2

(12) United States Patent
Hsu et al.

(10) Patent No.: US 12,803,668 B2
(45) Date of Patent: Nov. 17, 2026

(54) LENS MOUDLE AND TERMINAL DEVICE

(71) Applicant: TRIPLE WIN TECHNOLOGY(SHENZHEN) CO.LTD., Shenzhen (CN)

(72) Inventors: Hsin-Yen Hsu, New Taipei (TW); Tzu-Li Feng, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 253 days.

(21) Appl. No.: 18/752,858

(22) Filed: Jun. 25, 2024

(65) Prior Publication Data

US 2025/0253951 A1 Aug. 7, 2025

(30) Foreign Application Priority Data

Feb. 1, 2024 (CN) ......................... 202410145214.1

(51) Int. Cl.

*H04B 10/25* (2013.01)
*G02B 6/42* (2006.01)
*H04B 10/50* (2013.01)
*H04B 10/60* (2013.01)

(52) U.S. Cl.

CPC ........... *H04B 10/25* (2013.01); *G02B 6/4246* (2013.01); *H04B 10/503* (2013.01); *H04B 10/60* (2013.01)

(58) Field of Classification Search

CPC ...... H04B 10/25; H04B 10/503; H04B 10/60; G02B 6/4246

See application file for complete search history.

(56) References Cited

U.S. PATENT DOCUMENTS

| | | | | |
|---|---|---|---|---|
| 8,223,248 B2 * | 7/2012 | Lee | H10F 39/806 348/340 |
| 10,466,433 B2 * | 11/2019 | Epitaux | G02B 6/4214 |
| 2010/0265349 A1 * | 10/2010 | Kim | H04B 10/801 348/222.1 |
| 2011/0135252 A1 * | 6/2011 | Kim | G02B 6/43 385/52 |

* cited by examiner

*Primary Examiner* — Kenneth N Vanderpuye
*Assistant Examiner* — Asif Shameem
(74) *Attorney, Agent, or Firm* — ScienBiziP, P.C.

(57) ABSTRACT

A lens module includes a light source, a first silicon photonics chip, an image sensor, and an optical fiber. The image sensor is electrically connected to the first silicon photonics chip. The optical fiber is coupled to the first silicon photonics chip. The first silicon photonics chip can receive light emitted by the light source and form first optical signals, the image sensor can convert an optical image into electrical signals and transmit the electrical signals to the first silicon photonics chip, the first silicon photonics chip can modulate the first optical signals with the electrical signals to form second optical signals, and the optical fiber can transmit the second optical signal. The present disclosure further provides a terminal device.

16 Claims, 5 Drawing Sheets

LENS MOUDLE AND TERMINAL DEVICE

FIELD

The subject matter herein generally relates to optical device technology, and more particularly, to a lens module and a terminal device.

BACKGROUND

A terminal device includes a lens module and a main board electrically connected to the lens module. Electrical signals are transmitted between the main board and the lens module. As a transmission distance increases, an attenuation of electrical signals also increases. Additionally, the transmission of electrical signals can be affected by electromagnetic interference, which can degrade a quality of the transmission of the electrical signals. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
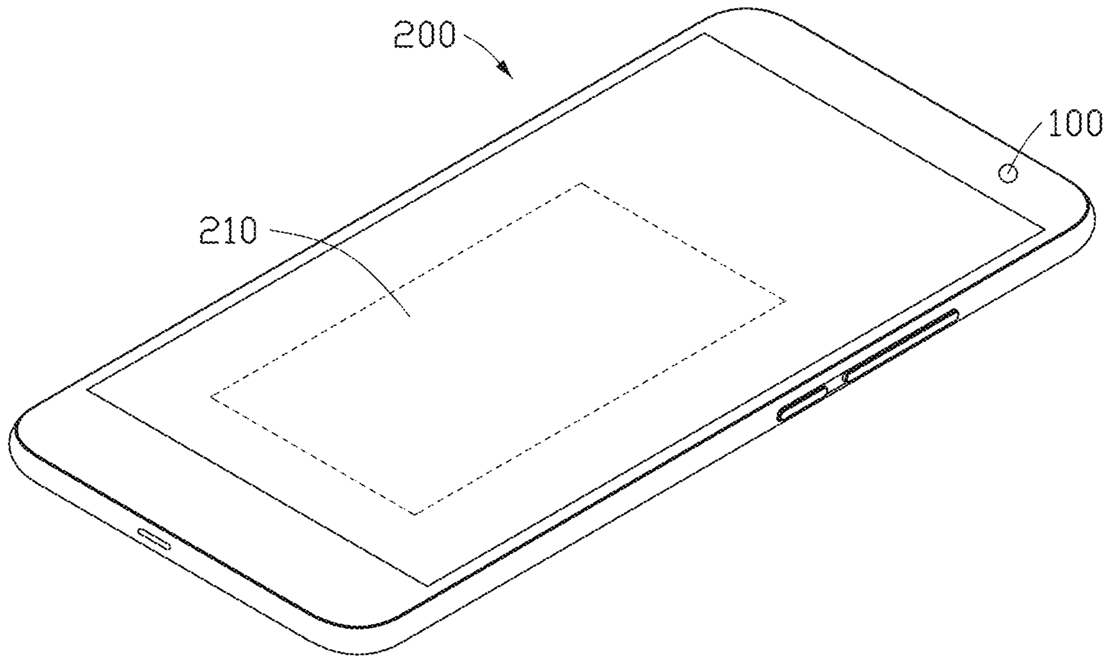
FIG. 1 is a diagrammatic view of an embodiment of a terminal device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Referring to FIG. 1, a terminal device 200 is provided according to an embodiment of the present disclosure. The terminal device 200 is a product including a lens module 100, and the terminal device 200 may be a mobile phone, a camera, a monitor, a drone, or other electronic devices.

Figure 2:
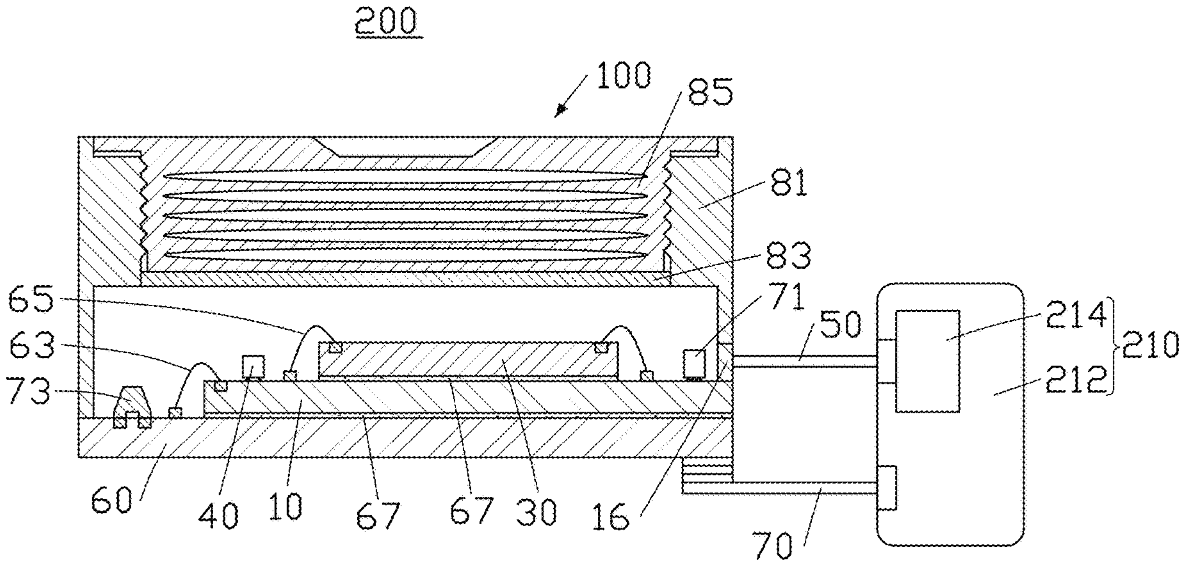
FIG. 2 is a cross-sectional view of an embodiment of a terminal device according to the present disclosure.
Figure 3:
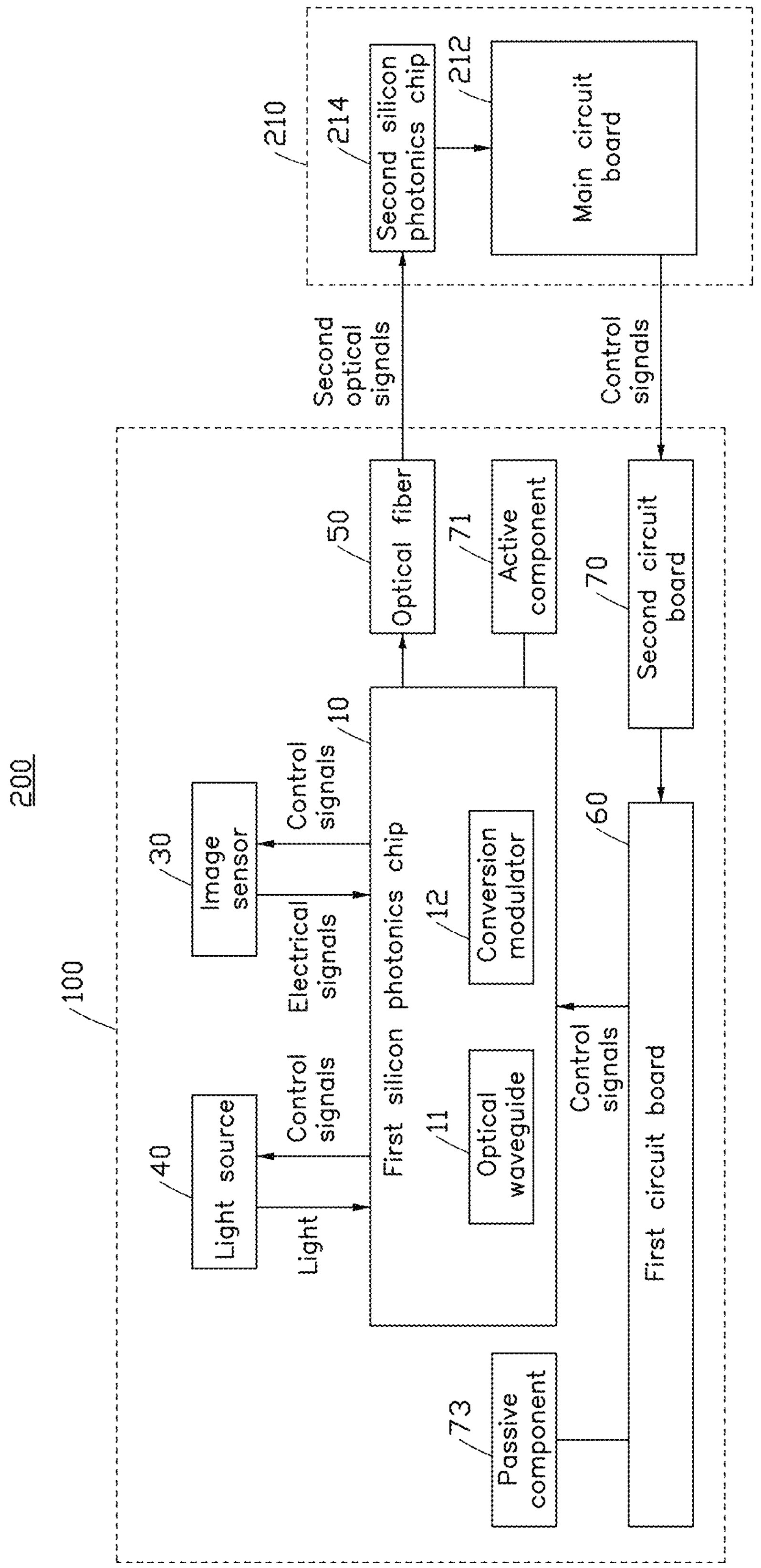
FIG. 3 is a diagrammatic of an embodiment of signal transmission in the terminal device of the present disclosure.

Referring to FIGS. 2 and 3, the terminal device 200 further includes a main board 210, which is communicatively connected to the lens module 100. The lens module 100 includes a first silicon photonics chip 10, an image sensor 30, a light source 40, and an optical fiber 50. The main board 210 can generate control signals and transmits the control signals to the lens module 100. The image sensor 30 can generate electrical signals and transmit the electrical signals to the first silicon photonics chip 10. Simultaneously, the light source 40 can emit light to illuminate the first silicon photonics chip 10. The first silicon photonics chip 10 can receive light from the light source 40 to generate first optical signals, and modulate the first optical signals with the electrical signals to form second optical signals. The second optical signals are transmitted to the main board 210 through the optical fiber 50, thereby realizing the communicating connection between the lens module 100 and the main board 210.

The main board 210 can be a processor of the terminal device 200. The main board 210 includes a main circuit board 212 and a second silicon photonics chip 214. The second silicon photonics chip 214 is disposed on the main circuit board 212 and electrically connected to the main circuit board 212. The main circuit board 212 can be a rigid circuit board. Other electronic components besides the second silicon photonics chip 214 can further be connected to the main circuit board 212. The second silicon photonics chip 214 can receive the second optical signals transmitted by the optical fiber 50, and convert the second optical signals into electrical signals. The electrical signals are then transmitted to other electronic components on the main circuit board 212 for processing.

The lens module 100 can further include a first circuit board 60 and a second circuit board 70. The first circuit board 60 and the second circuit board 70 can electrically connect the main board 210 to the first silicon photonics chip 10. The main board 210 can send the control signals, which are electrical signals and can be transmitted to the first silicon photonics chip 10 through the first circuit board 60 and the second circuit board 70. The first circuit board 60 connects the first silicon photonics chip 10 to the second circuit board 70, and the second circuit board 70 connects the main circuit board 212 to the first circuit board 60. In the embodiment, the first circuit board 60 is a rigid circuit board that can support the first silicon photonics chip 10. The second circuit board 70 is a flexible circuit board and can be bent. In other embodiments, the first circuit board 60 and the second circuit board 70 can be integrated as a rigid-flexible circuit board. In other embodiments, the second circuit board 70 can be replaced by a copper cable.

In the embodiment, the first silicon photonics chip 10 is disposed on a surface of the first circuit board 60 and electrically connected to the first circuit board 60 via a first wire 63. The first circuit board 60 supports the first silicon photonics chip 10. The first wire 63 can be a metal wire such as gold wire, copper wire, silver wire, or alloy wire. The image sensor 30 is disposed on a surface of the first silicon photonics chip 10 opposite to the first circuit board 60. The image sensor 30, the first silicon photonics chip 10, and the first circuit board 60 are stacked in that order. The image sensor 30 is electrically connected to the first silicon photonics chip 10 via a second wire 65. The second wire 65 can be a metal wire such as gold wire, copper wire, silver wire, or an alloy wire. An adhesive 67 is disposed between the image sensor 30 and the first silicon photonics chip 10, and another adhesive 67 is disposed between the first silicon photonics chip 10 and the first circuit board 60, to increase the bonding force between adjacent components.

The light source 40 is disposed on a surface of the first silicon photonics chip 10 opposite to the first circuit board 60 and electrically connected to the first silicon photonics chip 10. The light source 40 and the image sensor 30 are spaced apart from each other. The light source 40 can emit light based on the control signals transmitted by the first silicon photonics chip 10. The light emitted by the light source 40 illuminates the first silicon photonics chip 10. The light source 40 can be a vertical cavity surface emitting laser (VCSEL).

In some embodiments, the first silicon photonics chip 10 includes an optical waveguide 11 and a conversion modulator 12, which are functionally connected to each other to achieve their respective intended functions and thereby implement the overall function of the first silicon photonics chip 10. When the light emitted by the light source 40 illuminates the first silicon photonics chip 10, the optical waveguide 11 can transmit the first optical signals formed by the light to the conversion modulator 12. The first optical signals are transmitted along a specific path according to principle of total internal reflection, and signal attenuation is reduced. The conversion modulator 12 modulates the first optical signals with the electrical signals, by changing parameters of the first optical signals (such as amplitude, phase, frequency, wavelength, or polarization direction), to enable the first optical signals to carry information of the electrical signals and form the second optical signals. Then, the second optical signals are further transmitted through the optical waveguide 11 to the optical fiber 50.

In some embodiments, the conversion modulator 12 can have both the functions of electro-optic conversion and signal modulation, or the conversion modulator 12 can be two separate components that have the functions of electro-optic conversion and signal modulation, respectively.

In some embodiments, the conversion modulator 12 can have both the functions electro-optic conversion and opto-electric conversion, or the conversion modulator 12 can be two separate component that have the functions of electro-optic conversion and the opto-electric conversion, respectively.

Figure 4:
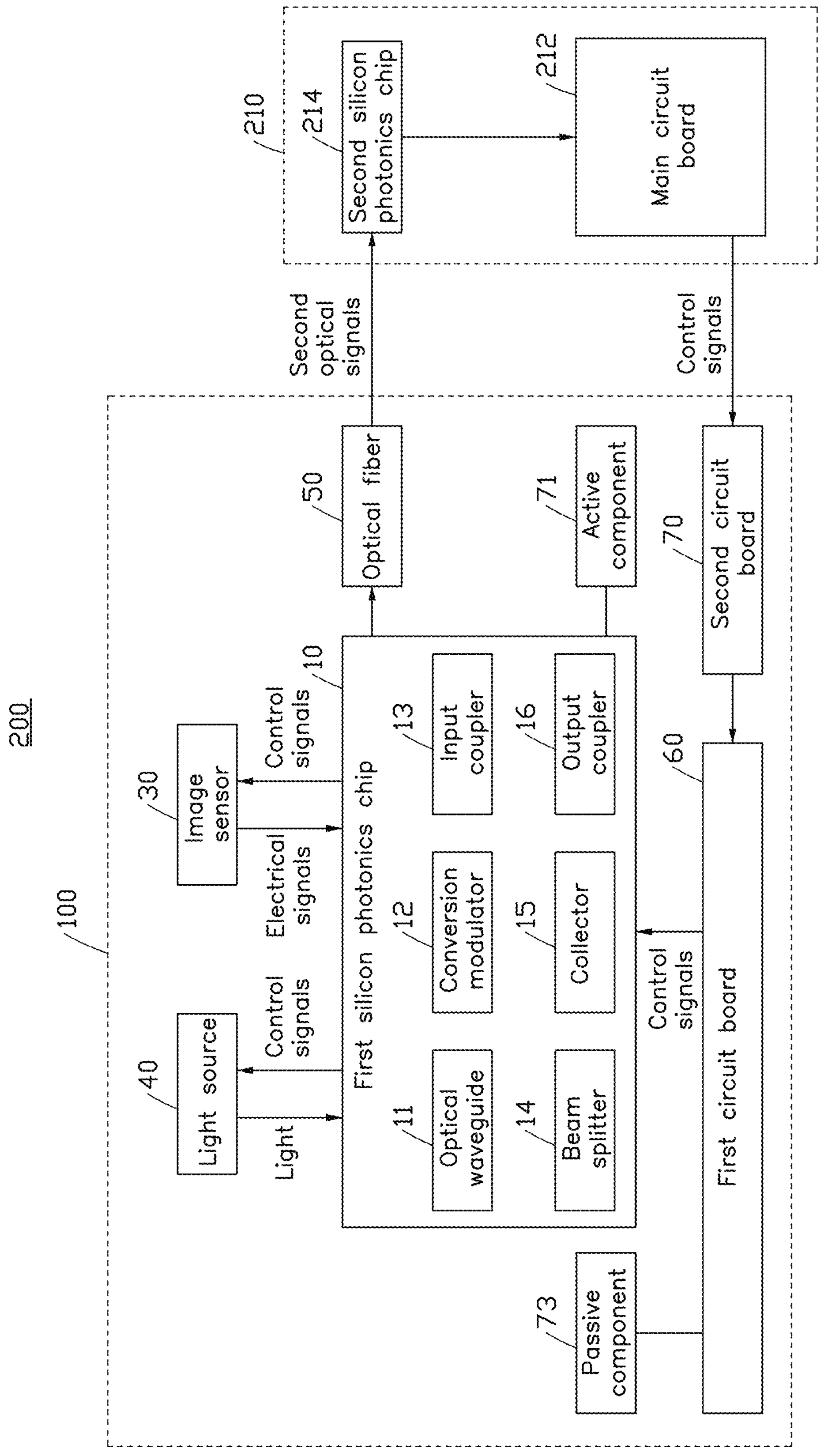
FIG. 4 is a diagrammatic of yet another embodiment of signal transmission in a terminal device of the present disclosure.

Referring to FIG. 4, in other embodiments, the first silicon photonics chip 10 includes an input coupler 13, an optical waveguide 11, a beam splitter 14, a plurality of conversion modulators 12, a collector 15, and an output coupler 16. The input coupler 13, the optical waveguide 11, the beam splitter 14, the conversion modulators 12, the collector 15, and the output coupler 16 are functionally connected to each other to achieve their respective intended functions and thereby implement the overall function of the first silicon photonics chip 10. The input coupler 13 acts as an entrance of light emitted by the light source 40, and can couple the light into an interior of the first silicon photonics chip 10 to form the first optical signals. The optical waveguide 11 can transmit the first optical signals formed by the light to the conversion modulators 12. The first optical signals are transmitted along a specific path according to principle of total internal reflection, and signal attenuation is reduced. The beam splitter 14 can divide the first optical signals received by the input coupler 13 into a plurality of portions, and different portions of the first optical signals are sent to different conversion modulators 12 for processing. The conversion modulators 12 can modulate the first optical signals with the electrical signals to form the second optical signals. The collector 15 can collect and converge the second optical signals modulated by the conversion modulators 12, and then transmit the converged signals to the output coupler 16. The output coupler 16 acts as an exit of the first silicon photonics chip 10 and can coupled to the optical fiber 50, so that the first silicon photonics chip 10 can achieve high-speed, low-loss, and highly reliable information transmission and processing functions.

The optical fiber 50 is connected to a surface of the first silicon photonics chip 10 opposite to the first circuit board 60, and extends outward relative to the first silicon photonics chip 10. The second circuit board 70 is connected to a surface of the first circuit board 60 opposite to the first silicon photonics chip 10, and extends outward relative to the first circuit board 60. The optical fiber 50 is coupled to the first silicon photonics chip 10 and the second silicon photonics chip 214. The optical fiber 50 can transmit the second optical signals modulated by the first silicon photonics chip 10 to the second silicon photonics chip 214. The second silicon photonics chip 214 can receive the second optical signals transmitted by the optical fiber 50. The second silicon photonics chip 214 can convert the received second optical signals into the electrical signals and transmit electrical signals to the main circuit board 212.

The main board 210 can generate control signals such as for controlling the lens module 100 to capture images. The control signals are sequentially transmitted through the second circuit board 70, the first circuit board 60, and the first silicon photonics chip 10 to each of the image sensor 30 and the light source 40. After receiving the control signals, the image sensor 30 can convert optical images into electrical signals and transmit the electrical signals to the first silicon photonics chip 10. At the same time, the light source 40 can receive the control signals and emit light to illuminate the first silicon photonics chip 10. When being illuminated, the first silicon photonics chip 10 receives the first optical signals from the light source 40 and modulates the first optical signals into the second optical signals using electrical signals. The optical fiber 50 can transmit the second optical signals to the second silicon photonics chip 214. The second silicon photonics chip 214 can receive the second optical signals transmitted by the optical fiber 50. The second silicon photonics chip 214 can convert the received second optical signals into the electrical signals and transmits the electrical signals to the main circuit board 212.

The lens module 100 can transmit control signals from the main board 210 through electrical signals. The first silicon photonics chip 10 modulates the electrical signals generated by the image sensor 30 into first optical signals to form the second optical signals. Then, the second optical signals are then transmitted to the main board 210 through the optical fiber 50. The second optical signals are transmitted through the optical fiber 50, which is immune to electromagnetic interference and can transmit larger data volumes under high-frequency conditions, and can improve signals transmission stability. When signal transmission is required over long distances, the signal attenuation of the second optical signals is much less than that of the electrical signals. For the transmission of high-resolution or high-frame rate image data, a high-bandwidth transmission capability of the second optical signals can better meet the transmission requirements. A high packaging density of the lens module 100, including the first silicon photonics chip 10, can reduce a volume and weight of the terminal device 200. Additionally, the low power consumption characteristics of the first silicon photonics chip 10 can reduce the overall power consumption of the terminal device 200.

In the embodiment, the lens module 100 can further include an active component 71 and a passive component 73. The active component 71 is connected to the first silicon photonics chip 10, and the passive component 73 is connected to the first circuit board 60. Both the active component 71 and the passive component 73 are disposed on the same surface of the first circuit board 60. In other embodiments, the positions of the active component 71 and the passive component 73 are not limited.

The lens module 100 can further include a bracket 81, a filter 83, and a lens 85. The bracket 81 is disposed on the surface of the first circuit board 60 where the first silicon photonics chip 10 is disposed. The filter 83 is fixed on the bracket 81 and spaced apart from the image sensor 30. The lens 85 is detachably accommodated in the bracket 81.

Figure 5:
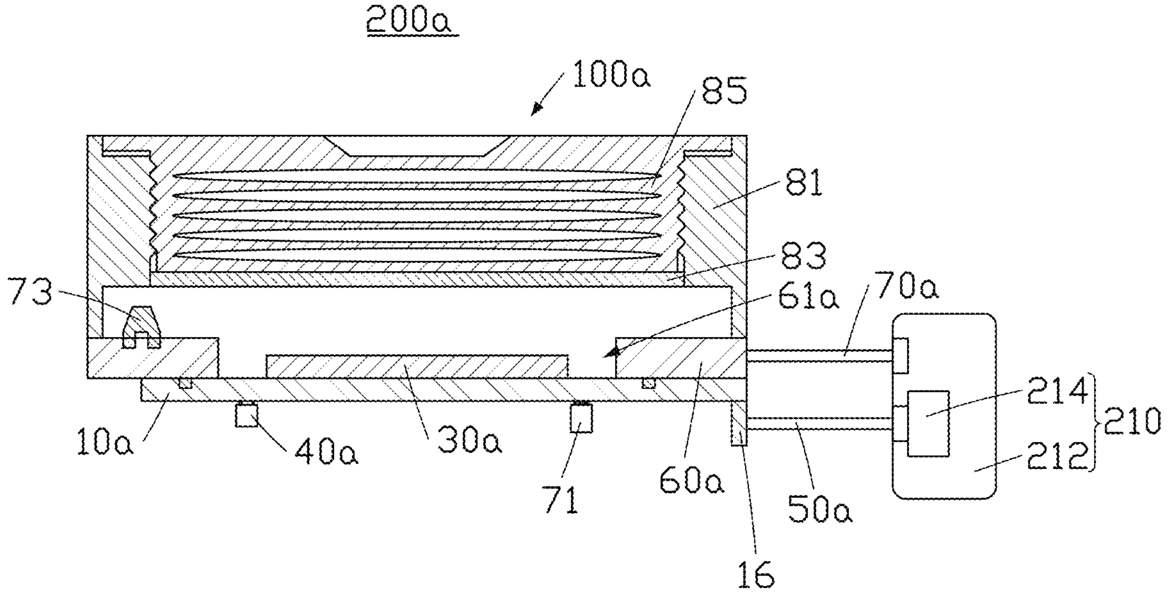
FIG. 5 is a cross-sectional view of yet another embodiment of a terminal device according to the present disclosure.

Referring to FIG. 5, a terminal device 200*a* is provided according to another embodiment of the present disclosure. The terminal device 200*a* includes a lens module 100*a*, a first circuit board 60*a*, and an image sensor 30*a* on a same surface of the first silicon photonics chip 10*a*. In the embodiment, the first circuit board 60*a* is provided with a through hole 61*a*, and a portion of the surface of the first silicon photonics chip 10*a* is exposed from the through hole 61*a*. The image sensor 30*a* is accommodated in the through hole 61*a* and electrically connected to the first silicon photonics chip 10*a*. The optical fiber 50*a* is connected to a surface of the first silicon photonics chip 10*a* opposite to the first circuit board 60*a*. A thickness of the lens module 100*a* less than a thickness of the lens module 100. By electrically connecting a surface where the image sensor 30*a* is connected to the first silicon photonics chip 10*a*, the first wire 63 of the lens module 100 can be omitted. By electrically connecting a surface where the first silicon photonics chip 10*a* is connected to the first circuit board 60*a*, the second wire 65 of the lens module 100 can be omitted.

The light source 40*a* can be disposed on the surface of the first silicon photonics chip 10*a*. The active component 71 and the light source 40*a* are disposed on the same surface of the first silicon photonics chip 10*a*, and the passive component 73 is connected to the first circuit board 60*a*.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A lens module comprising:

a light source;

a first silicon photonics chip;

an image sensor electrically connected to the first silicon photonics chip;

an optical fiber coupled to the first silicon photonics chip;

a first circuit board, the first silicon photonics chip disposed on a surface of the first circuit board and electrically connected to the first circuit board, and the image sensor disposed on a surface of the first silicon photonics chip opposite to the first circuit board; and a second circuit board, connected to the first circuit board, the first circuit board and the second circuit board configured to receive control signals and transmit the control signals to the first silicon photonics chip;

wherein the first silicon photonics chip is configured to receive light emitted by the light source and form first optical signals, the image sensor is configured to convert an optical image into electrical signals and transmit the electrical signals to the first silicon photonics chip, the first silicon photonics chip is configured to modulate the first optical signals with the electrical signals to form second optical signals, and the optical fiber is configured to transmit the second optical signal.

2. The lens module of claim 1, further comprising a first wire and a second wire, wherein the first silicon photonics chip is electrically connected to the first circuit board through the first wire, and the image sensor is electrically connected to the first silicon photonics chip through the second wire.

3. The lens module of claim 1, wherein the first silicon photonics chip comprises an optical waveguide and a conversion modulator, the optical waveguide is configured to transmit the first optical signals to the conversion modulator and transmit the second optical signals to the optical fiber, the conversion modulator is configured to modulate the first optical signals with the electrical signals to form the second optical signals.

4. The lens module of claim 1, wherein the first silicon photonics chip further comprises an input coupler, an optical waveguide, a beam splitter, a plurality of conversion modulators, a collector, and an output coupler, the input coupler is configured to receive the light emitted by the light source and couple the light into the first silicon photonics chip to form the first optical signals, the optical waveguide is configured to transmit the first optical signals to the plurality of conversion modulators and transmit the second optical signals to the output coupler, the beam splitter is configured to divide the first optical signals received by the input coupler into a plurality of signal portions and transmit the plurality of signal portions to the plurality of conversion modulators, the plurality of conversion modulators is configured to modulate the plurality of signal portions with the electrical signals to form the second optical signals, the collector is configured to collect and converge the second optical signals, and the output coupler is configured to transmit the converged second optical signals to the optical fiber.

5. The lens module of claim 1, wherein the light source is a vertical cavity surface emitting laser.

6. A terminal device comprising a lens module comprising:

a light source;

a first silicon photonics chip;

an image sensor electrically connected to the first silicon photonics chip; and an optical fiber coupled to the first silicon photonics chip; and a main board, communicatively connected to the lens module, the main board comprising a main circuit board and a second silicon photonics chip electrically connected to the main circuit board, the main circuit board configured to generate control signals to the lens module, the second silicon photonics chip configured to receive the second optical signals transmitted by the optical fiber and convert the second optical signals into electrical signals;

wherein the first silicon photonics chip is configured to receive light emitted by the light source and form first optical signals, the image sensor is configured to convert an optical image into electrical signals and transmit the electrical signals to the first silicon photonics chip, the first silicon photonics chip is configured to modulate the first optical signals with the electrical signals to form second optical signals, and the optical fiber is configured to transmit the second optical signal.

7. The terminal device of claim 6, wherein the lens module comprising a first circuit board, wherein the first silicon photonics chip is disposed on a surface of the first circuit board and electrically connected to the first circuit board, and the image sensor is disposed on a surface of the first silicon photonics chip opposite to the first circuit board.

8. The terminal device of claim 7, further comprising a first wire and a second wire, wherein the first silicon photonics chip is electrically connected to the first circuit board through the first wire, and the image sensor is electrically connected to the first silicon photonics chip through the second wire.

9. The terminal device of claim 6, wherein the first silicon photonics chip comprises an optical waveguide and a conversion modulator, the optical waveguide is configured to transmit the first optical signals to the conversion modulator and transmit the second optical signals to the optical fiber, the conversion modulator is configured to modulate the first optical signals with the electrical signals to form the second optical signals.

10. The terminal device of claim 6, wherein the first silicon photonics chip further comprises an input coupler, an optical waveguide, a beam splitter, a plurality of conversion modulators, a collector, and an output coupler, the input coupler is configured to receive the light emitted by the light source and couple the light into the first silicon photonics chip to form the first optical signals, the optical waveguide is configured to transmit the first optical signals to the plurality of conversion modulators and transmit the second optical signals to the output coupler, the beam splitter is configured to divide the first optical signals received by the input coupler into a plurality of signal portions and transmit the plurality of signal portions to the plurality of conversion modulators, the plurality of conversion modulators is configured to modulate the plurality of signal portions with the electrical signals to form the second optical signals, the collector is configured to collect and converge the second optical signals, and the output coupler is configured to transmit the converged second optical signals to the optical fiber.

11. The terminal device of claim 6, wherein the lens module further comprising a first circuit board, the first circuit board and the image sensor are disposed on a same surface of the first silicon photonics chip, a through hole is defined on the first circuit board, a portion of the surface of the first silicon photonics chip is exposed from the through hole, and the image sensor is accommodated in the through hole.

12. The terminal device of claim 6, wherein the light source is a vertical cavity surface emitting laser.

13. The terminal device of claim 7, wherein lens module further comprising a second circuit board, the second circuit board is connected to the first circuit board, the first circuit board and the second circuit board are configured to receive control signals and transmit the control signals to the first silicon photonics chip.

14. A lens module comprising:

a light source;

a first silicon photonics chip;

an image sensor electrically connected to the first silicon photonics chip;

an optical fiber coupled to the first silicon photonics chip; and a first circuit board, the first circuit board and the image sensor disposed on a same surface of the first silicon photonics chip, a through hole defined on the first circuit board, a portion of the surface of the first silicon photonics chip exposed from the through hole, and the image sensor accommodated in the through hole;

wherein the first silicon photonics chip is configured to receive light emitted by the light source and form first optical signals, the image sensor is configured to convert an optical image into electrical signals and transmit the electrical signals to the first silicon photonics chip, the first silicon photonics chip is configured to modulate the first optical signals with the electrical signals to form second optical signals, and the optical fiber is configured to transmit the second optical signal.

15. The lens module of claim 14, further comprising a second circuit board, wherein the second circuit board is connected to the first circuit board, the first circuit board and the second circuit board are configured to receive control signals and transmit the control signals to the first silicon photonics chip.

16. The lens module of claim 14, wherein the light source is a vertical cavity surface emitting laser.

* * * * *